United States Patent [19]
Bresnahan

[11] Patent Number: 5,782,681
[45] Date of Patent: Jul. 21, 1998

[54] CONDITIONER FOR WINDSHIELD WIPER BLADES

[76] Inventor: William Bresnahan, 1090A Troxel Rd., Lansdale, Pa. 19446

[21] Appl. No.: 753,937

[22] Filed: Dec. 3, 1996

[51] Int. Cl.$^6$ ................................................ B24D 15/02
[52] U.S. Cl. .......................... 451/523; 451/555; 451/558; 451/524
[58] Field of Search ................................. 451/523, 524, 451/555, 558, 557, 451

[56] References Cited

U.S. PATENT DOCUMENTS

| | | | |
|---|---|---|---|
| 2,414,535 | 1/1947 | Kaufman | 451/524 |
| 3,708,924 | 1/1973 | Prunchak | 451/558 |
| 4,617,765 | 10/1986 | Weiler | 451/555 |
| 5,106,056 | 4/1992 | Crates et al. | 254/134.3 FT |
| 5,163,251 | 11/1992 | Lee | 451/555 |
| 5,426,895 | 6/1995 | Siciliano et al. | 451/558 |
| 5,440,953 | 8/1995 | Gangelhoff et al. | 451/555 |
| 5,512,010 | 4/1996 | Labad, Jr. | 451/524 |

*Primary Examiner*—Eileen P. Morgan
*Attorney, Agent, or Firm*—Alfred F. Hoyte, Jr.

[57] ABSTRACT

The invention relates to a two part hand held windshield wiper conditioning device with a main body or housing having a male half and a female half having contoured outer surfaces. Both halves of the device are substantially triangular, the male half having three continuous projections, one per side, extending along the edge of its inner surface; and the female half having corresponding slots formed in and proximate the edge of its inner surface. The projections and corresponding slots allow for snug frictional engagement between the male half and the female half. One of the projections has a course material adhered thereto, the edges of the male and female half proximate the course material being spaced apart thereby defining a channel sized to receive the windshield wiper blade edge. Both the male and female half have recesses formed in the inner surface, the recesses defining an interior space where a packet is stored when the halves are joined. The packet contains a towlette which is pre-moistened with a conditioning solution. The solution, when applied by the towlette, both cleans and conditions the wiper blade. The two part member when assembled together is designed so that a worn windshield wiper blade drawn through the channel will have its rough and burred surfaces smoothed and reconditioned as the blade is moved along the sandpaper surface.

1 Claim, 3 Drawing Sheets

CONDITIONER FOR WINDSHIELD WIPER BLADES

BACKGROUND OF THE INVENTION

1. Field of the Invention

The present invention relates to windshield wiper blade conditioners. More particularly, the invention contemplates a windshield wiper blade conditioning system.

Thus it can be seen that the potential fields of use for this invention are myriad and the particular preferred embodiments described herein is in no way meant to limit the use of the invention to the particular field chosen for exposition of the details of the invention.

A comprehensive listing of all the possible fields to which this invention may be applied is limited only by the imagination and is therefore not provided herein. Some of the more obvious applications are mentioned herein in the interest of providing a full and complete disclosure of the unique properties of this previously unknown general purpose article of manufacture. It is to be understood from the outset that the scope of this invention is not limited to these fields or to the specific examples of potential uses presented hereinafter.

2. Description of the Prior Art

Conditioners for worn windshield wiper blades for removing the roughened outer blade surface thereby reconditioning the blade surface intended to clean the windshield are known.

One disadvantage of some of the prior art windshield wiper blade conditioners is that the wiper blades have been generally sharpened metal, razor type blades, which blades must be protected to avoid injury to the user. This disadvantage is overcome in U.S. Pat. No. 5,359,776 by limiting the opening through which the blade to be reconditioned is passed. However, this device does not completely cover the blade sharpening member. In contrast thereto the windshield wiper blade reconditioning member of the invention uses a piece of sandpaper or like material to remove the roughened outer edges of the blade being treated.

U.S. Pat. No. 2,865,100 discloses a deburring tool having edges which bear on rough workpiece edges. The instrument is equally well adapted to plastic and other materials which may be worked similar to metal, resulting in rough edges containing projections which are to be removed. In contrast with the present invention the means to recondition the windshield wiper blades has a two part separable triangular shaped main body having an exterior slot into which the blade is inserted to pass over the coarse surface of sandpaper in the exterior slot.

U.S. Pat. No. 4,481,690 discloses a combination scraper and key case having a hollow opening providing a compartment for keys, coins or the like. The present invention has a separable two part housing having an interior compartment when the parts are fastened together, the compartment accommodating a packaged swab or like member capable of being used to clean and condition the edges of the wiper blades.

U.S. Pat. No. 3,644,993 discloses a device for trimming the edge of an object including a hand-held guide member having an object-engaging part and a grip. In contrast to the presently disclosed invention the separable two part housing of the windshield wiper blade conditioning device has elliptical shaped contoured surfaces for gripping.

SUMMARY OF THE INVENTION

The invention relates to a two part hand held windshield wiper conditioning device with a main body or housing having a male half and a female half having contoured outer surfaces. Both halves of the device are substantially triangular, the male half having three continuous projections, one per side, extending along the edge of its inner surface; and the female half having corresponding slots formed in and proximate the edge of its inner surface. The projections and corresponding slots allow for snug frictional engagement between the male half and the female half. One of the projections has a coarse, sandpaper-like, material adhered thereto, the edges of the male and female half proximate the coarse material being spaced apart thereby defining a channel sized to receive the windshield wiper blade edge. Both the male and female half have recesses formed in the inner surface, the recesses defining an interior space where a packet is stored when the halves are joined. The packet contains a towlette which is premoistened with a conditioning solution. The solution, when applied by the towlette, both cleans and conditions the wiper blade. The two part member when assembled together is designed so that a worn windshield wiper blade drawn through the channel will have its rough and burred surfaces smoothed and reconditioned as the blade is moved along the sandpaper surface. The two part member has an opening extending through the two part housing for a key chain or similar member and elliptical shaped indentations formed in the exterior surface for accommodating a finger and thumb. On one end of the cover or housing there is formed a widened section for easy entrance of the wiper blade to be treated.

Thus, it is an object of the invention to provide an improved windshield wiper device.

It is another object of the invention to provide an improved windshield wiper conditioning device which does not use blades of other sharp edges.

It is another object of the invention to provide an improved windshield wiper conditioning device which is contoured to allow for easy manipulation.

It is another object of the invention to provide an improved windshield wiper conditioning device having an interior space for removably storing a conditioning towlette.

It is another object of the invention to provide an improved windshield wiper conditioning device having a solution for conditioning the wiper blade.

Finally, it is a general goal of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

The present invention meets or exceeds all the above objects and goals. Upon further study of the specification and appended claims, further objects and advantages of this invention will become apparent to those skilled in the art.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 2:
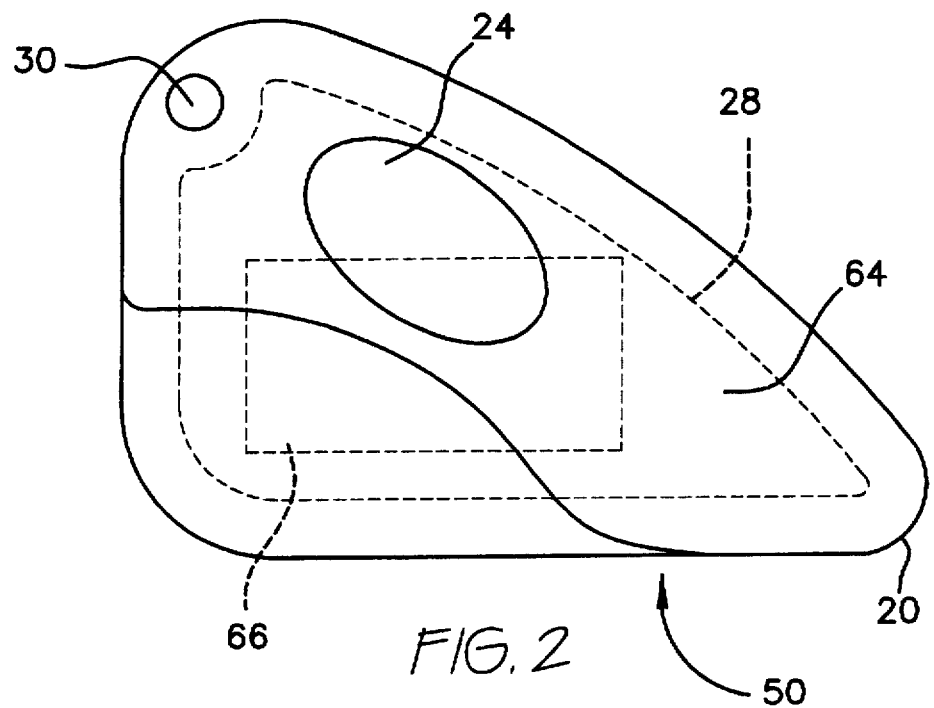
FIG. 2 is a front view of the windshield wiper conditioning device of the present invention.
Figure 1:
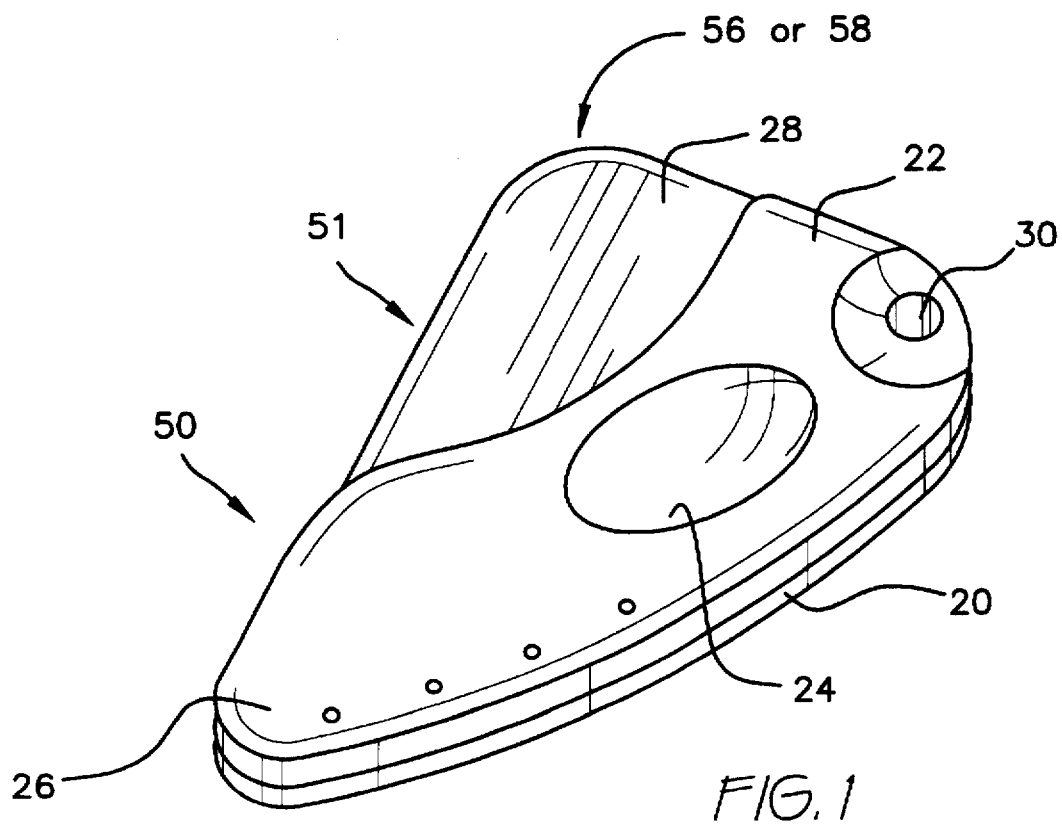
FIG. 1 is a perspective view of the windshield wiper conditioning device of the present invention.

Referring now to FIG. 1, a perspective view of the device of the present invention, generally indicated by the reference numeral 10, is shown. The device 10 has a substantially triangular main body 20, with a contoured outer surface 22 including finger sized indentations 24 to facilitate easier manipulation of the device 10. Manipulation of the device 10 is further improved by making a portion 26 of the main body 20 relatively thick. The thinner flat region 28 has sufficient surface area so that a logo or the like may be imprinted thereon. An aperture 30 extending through the main body 20 allows the device 10 to be used as a key chain.

Figure 3:
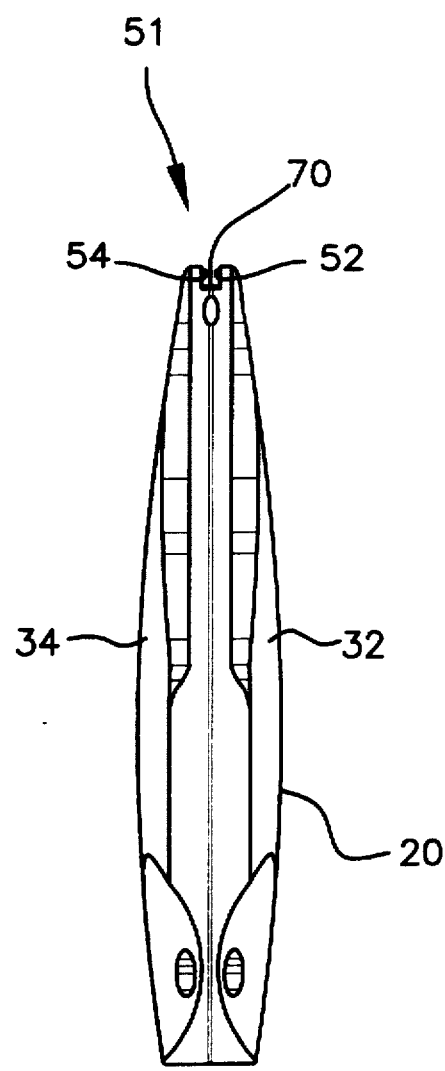
FIG. 3 is a side view of the windshield wiper conditioning device of the present invention.
Figure 4:
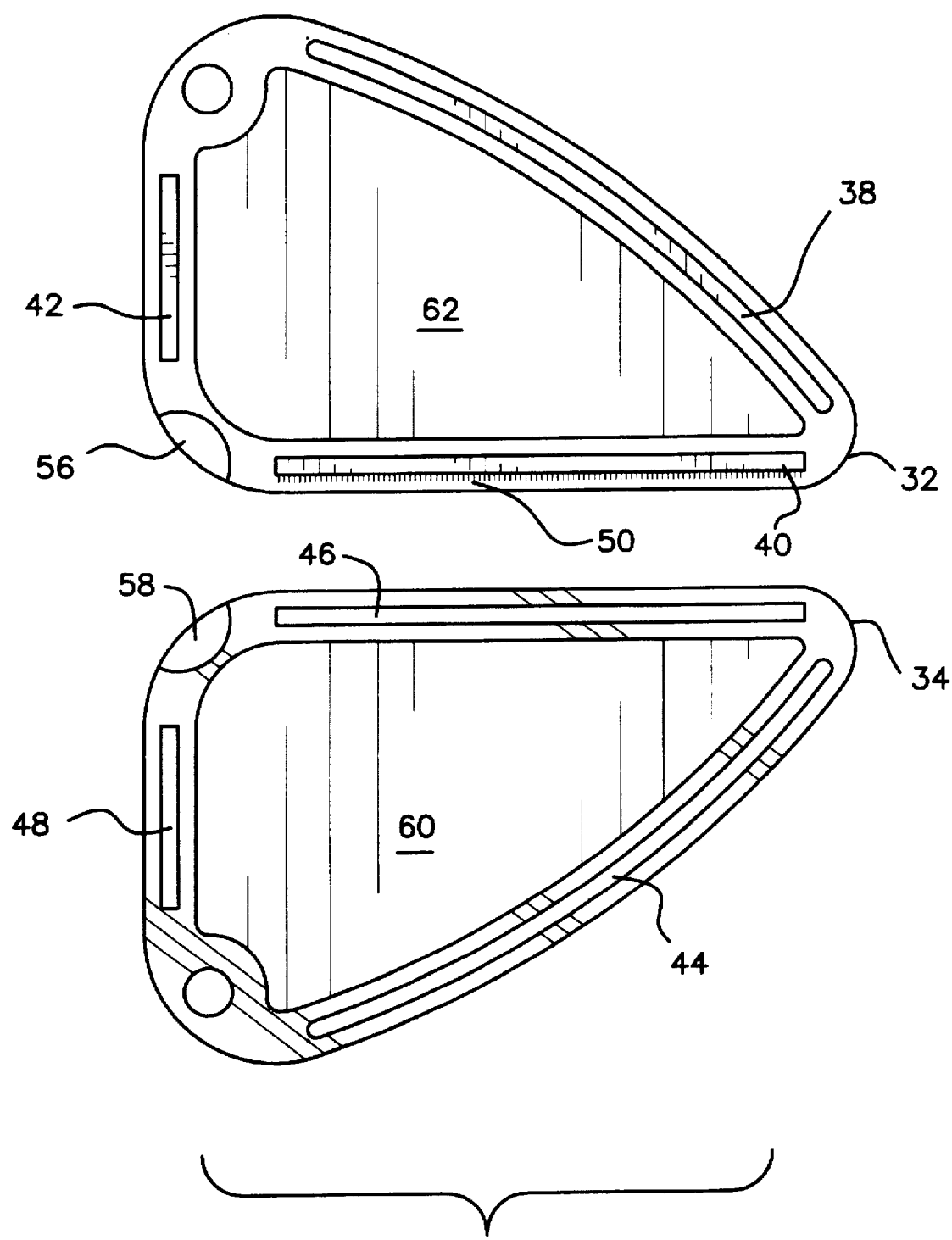
FIG. 4 shows the interior of the windshield wiper conditioning device of the present invention.

Referring to FIGS. 1–4, the main body 20 of the device 10 is comprised of two halves, 32 and 34, as can be seen most clearly in FIG. 4. The two halves 32, 34 can be removably joined via continuous projections 38, 40, 42 on the male half 32; and corresponding slots 44, 46, and 48 on the female half 34. Projection 40 has a strip of abrasive metallic material 50 secured thereto, e.g., by adhesive. The metallic material 50, sandpaper, or equivalent serves to remove a thin layer of the wiper blade (not shown) as will be further explained later. As can be seen in FIG. 3, the bottom 50 of a channel 51 is formed by recessed edge portions 52, 54 of male and female halves 32, 34. Each half 32, 34 has a indentation 56, 58 formed therein so as to be proximate the bottom 50 of channel 51 when the halves are joined. The indentations 56, 58 define an opening which allows for easier access to the wiper blade.

Recessed areas 60, 62 are formed in the interior surfaces of both the male and female halves 32, 34. Thus, when the halves 32, 34 are joined there is an interior void 64 within which an article may be stored. In accordance with the invention, a moistened towlette 66 is stored in the void. The towlette 66 is moistened with a rubber conditioning solution. The solution helps to prevent dry rotting of the wiper blade, and also removes any grease or other buildup which normally collects on wiper blade surfaces.

In the preferred embodiment, the composition disclosed in a patent issued to Todd C. Marshall, U.S. Pat. No. 5,447,645, dated Sep. 5, 1995, which is herein incorporated by reference, is used as the conditioning solution. This composition can be used to both lubricate and preserve the rubber thereby extending the life of the wiper blade.

In operation, the male half 32 and female half 34 are separated, and the towlette 66 is then removed. The towlette is then ran across the wiper blade, thereby cleaning and conditioning it. Then, after joining the male half 32 to the female half 34 one end of the wiper blade may be placed in the channel 51, with care being taken to ensure that the abrasive material 50 contacts the edge of the wiper blade. The device 10 is then moved along the length of the wiper blade edge until at least a thin layer of the edge has been removed.

In the preferred embodiment, the main body 20 should be made of neoprene or other rigid plastic or rubber material. Injection molding may be used to form the main body.

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the sole embodiment described above, but encompasses any and all embodiments within the scope of the following claims:

I claim:

1. A system for resurfacing, cleaning, and conditioning a wiper blade comprising in combination:

a housing, said housing having a substantially triangularly shaped main body with a contoured outer surface including mutually opposed finger size indentations to facilitate manipulation, said housing having male and female halves, said male and female halves removably joined by projections on the male half and corresponding slots on the female half, said male and female halves joined by frictional engagement, recessed areas formed in the interior surfaces of both the male and female halves defining an interior space completely surrounded on all sides when said halves are fastened in said frictional engagement; wherein a moistened towlette is stored in said completely surrounded interior space, said moistened towlette containing a conditioning and cleaning solution; wherein a channel is formed along one edge of said housing when both halves are engaged, said channel having a coarse material therein, said coarse material being sufficiently abrasive to remove a layer of said wiper blade whereby said wiper blade can be resurfaced by said resurfacing means and cleaned and conditioned by said towlette.

* * * * *